United States Patent [19]

Sotelo

[11] Patent Number: 5,788,271
[45] Date of Patent: Aug. 4, 1998

[54] AIR BAG SAFETY DEVICE FOR VEHICLES

[76] Inventor: Rudy Sotelo, 2401 Yorktown, Apt. 115, Ennis, Tex. 75119

[21] Appl. No.: 603,604

[22] Filed: Feb. 21, 1996

[51] Int. Cl.⁶ .................................................. B60R 21/22
[52] U.S. Cl. .................. 280/730.1; 280/735; 296/216.4; 296/464
[58] Field of Search .................. 280/730.1, 735, 280/743.1; 297/112, 216.1, 216.13, 216.14, 464, 488

[56] References Cited

U.S. PATENT DOCUMENTS

| | | | |
|---|---|---|---|
| 3,698,670 | 10/1972 | Ewing | 297/216.1 |
| 3,779,577 | 12/1973 | Wilfert | 280/730.1 |
| 4,508,294 | 4/1985 | Lorch | 244/122 |
| 4,946,191 | 8/1990 | Putsch | 280/730 |
| 5,100,170 | 3/1992 | Mihm et al. | 280/735 |
| 5,161,821 | 11/1992 | Curtis | 280/730 |
| 5,162,006 | 11/1992 | Yandle, II | 441/96 |
| 5,392,024 | 2/1995 | Kiuchi et al. | 280/735 |
| 5,474,327 | 12/1995 | Schousek | 280/730.1 |
| 5,525,843 | 6/1996 | Howing | 280/735 |

*Primary Examiner*—Eric D. Culbreth
*Attorney, Agent, or Firm*—Joseph N. Breaux

[57] ABSTRACT

An air bag safety device made up of a collision sensing system and an air bag deployment system. The air bag deployment system is activated by the collision sensing system and is positioned within a vehicle seat. An air bag having a shape corresponding to a lumbar spine and shoulder blade region of a human is deployed by the air bag deployment system into the region between the vehicle seat and a lumbar and shoulder blade region of an occupant of the vehicle seat following an impact.

4 Claims, 1 Drawing Sheet

AIR BAG SAFETY DEVICE FOR VEHICLES

TECHNICAL FIELD

The present invention relates to vehicle safety devices that deploy an air bag when a collision is sensed and more particularly to a vehicle safety devices that deploys an air bag from the back contacting portion of a vehicle seat when a collision is sensed to cushion the lumbar spine and shoulder blade regions of a vehicle occupant during a vehicle accident.

BACKGROUND ART

Automatically deployed air bags have been used advantageously to cushion the impact to the face, head and sides of vehicle occupants resulting from front end and side impact vehicle collisions. These air bags generally deploy from the steering column, dashboard, side support columns and the sidewall of the vehicle seats in a manner to place the air bag between the vehicle occupant and the site of impact. The cushioning effect of the air bag slows the energy transfer from the collision and results in reduced injuries to the vehicle occupants. Although these air bags function to protect the face, head and sides of the vehicle occupants during collisions, they do little to protect the lumbar spine region during the recoiling bounce that follows the initial forward impact of a front end type collision. This recoil bounce can result in injuries to the back and spine region of the vehicle occupant. It would be a benefit, therefore, to have an air bag system that would deploy an air bag, following a front end type collision, from the vehicle seat into the region between the vehicle seat and the lumbar and shoulder blade region of the vehicle seat occupant to spread out the energy of the recoil bounce and reduce associated injuries. It would be further benefit if the air bag system included a weight sensor in the vehicle seat that detected the presence of a vehicle seat occupant to prevent needless deployment of the air bag during a collision.

GENERAL SUMMARY DISCUSSION OF INVENTION

It is thus an object of the invention to provide an air bag safety device for vehicles that deploys an air bag, following a front end type collision, from the vehicle seat into the region located between the vehicle seat and the lumbar and shoulder blade region of the vehicle seat occupant.

It is a further object of the invention to provide an air bag safety device for vehicles that deploys an air bag, following a front end collision, from the vehicle seat into the region between the vehicle seat and the lumbar and shoulder blade region of the vehicle seat occupant that includes a weight sensor positioned within the vehicle seat that detects the presence of a seat occupant and enables activation of an air bag deployment system.

Accordingly, an air bag safety device for vehicles is provided. The air bag safety device comprises a collision sensing system including at least two collision sensing sensors each having a deployment control output, a safety sensor having a safety control output, and a weight sensor having a weight control output; and an air bag deployment system, positioned within a vehicle seat, having at least one deployment control input in electrical connection with the deployment control outputs of the at least two collision sensing sensors, a safety control input in electrical connection with the safety control output of the safety sensor, a weight sensor input in electrical connection with weight control output of the weight sensor, and a gas deployable contoured air bag having a shape corresponding to a lumbar spine and shoulder blade region of a human, the air bag deployment system being oriented with respect to the vehicle seat in a manner such that, when the air bag deploys, the air bag deploys into the region between the vehicle seat and a lumbar and shoulder blade region of an occupant of the vehicle seat, the air bag deployment system deploying the air bag upon detection by the air bag deployment system of a first safety control output signal from the safety sensor safety control output, a second weight control output signal from the weight sensor weigh control output, and at least one third deployment control signal from one of the collision sensor deployment control outputs.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
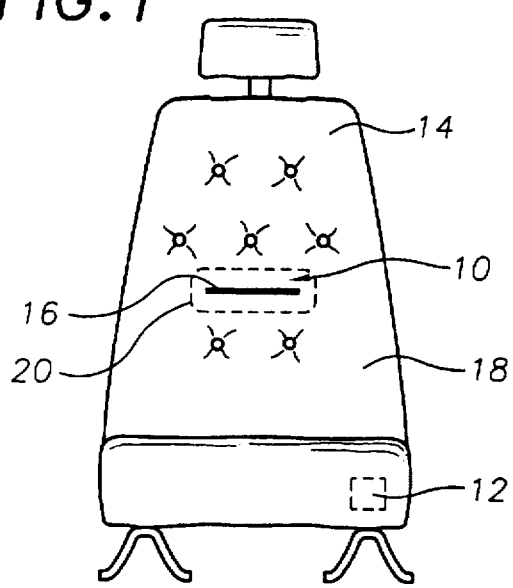
FIG. 1 is a frontal view of a representative vehicle seat having an exemplary embodiment of the air bag deployment system and weight sensor of the air bag safety device of the present invention installed therein.

As discussed herein before, the air bag safety device of the present invention includes a collision sensing system and an air bag deployment system. FIG. 1 shows an exemplary embodiment of the air bag deployment system, generally designated by the numeral 10, and a weight sensor 12 that forms a portion of the collision sensing system, installed within a representative vehicle seat 14.

Figure 2:
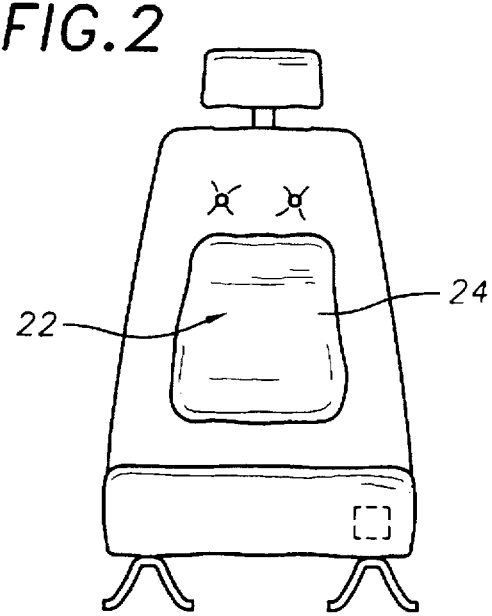
FIG. 2 is a frontal view of the vehicle seat of FIG. 1 with the contoured air bag deployed.
Figure 3:
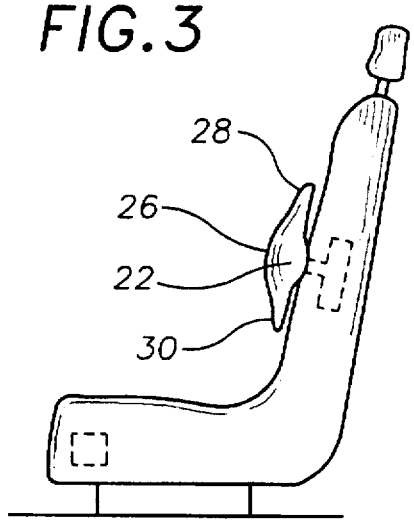
FIG. 3 is a side view of the vehicle seat of FIG. 1 with the contoured air bag deployed.

Air bag deployment system 10 includes a deployment port 16 that is positioned within vehicle seat 14 at a location that corresponds to the lumbar spine contacting portion of a back support surface 18 of vehicle seat 14. Back support surface 18 has been modified by the addition of a plurality of punctures 20 therethrough to increase the rupturability of back support surface 18 and, with reference to FIG. 2, allow a contoured air bag 22 to be deployed therethrough after a front end collision occurs. Contoured air bag 22 has an occupant contacting surface 24 that is shaped to correspond to the lumbar spine/shoulder blade region of a vehicle seat occupant. With reference to FIG. 3, contoured air bag 22 has about a five inch thick central portion 26 that tapers to about a two inch thickness at upper and lower ends 28,30.

Figure 4:
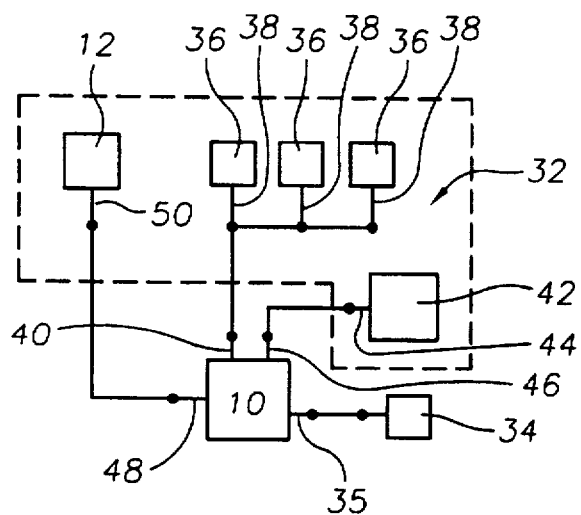
FIG. 4 is a schematic diagram of the exemplary air bag safety device including an optional back up power supply.

With reference to FIG. 4, the collision sensing system is shown schematically, surrounded by a dashed line and generally designated by the numeral 32, in connection with a schematic representation of air bag deployment system 10. A back up battery 34 is also shown. Back up battery 34 is wired to an auxiliary power input 35 of air bag deployment system 10 to ensure air bag deployment system 10 has sufficient power to activate in the event the collision interrupts conventional vehicle power sources.

Collision sensing system 32 includes three, conventional, accelerometer collision sensors 36, a conventional accelerometer safety sensor 42, and a conventional load cell weight sensor 12. Each collision sensor 36 has a deployment control output 38 wired to a deployment control input 40 of air bag deployment system 10. Safety sensor 42 has a safety control output 44 that is wired to a safety control input 46 of air bag deployment system 10. Weight sensor 12 has a weight control output 50 wired to a weight control input 48 of air bag deployment system 10.

Air bag deployment system 10 deploys air bag 22 upon detection by air bag deployment system 10 of a first safety control output signal from safety sensor 42's safety control output 44, a second weight control output signal from weight sensor 12's weight control output 50, and at least one third deployment control signal from one of the collision sensors 36 deployment control outputs 38.

Operation of the exemplary air bag safety device is now described with general reference to FIG. 1–4. Vehicle seat 14 is utilized in the same fashion as an unmodified vehicle seat. As each seat is occupied, a second weight control output signal is generated from weight sensor 12 and transmitted via weight control output 50 to weight control input 48 of air bag deployment system 10. When an impact occurs, the air bag deployment system receives the required additional control signals from at least one of the collisions sensors 36 and the safety sensor 42 and deploys air bag 22 into the region between seat surface 18 and the seat occupant after the seat occupant has been thrown forward by inertia. After impact between the occupant and the shoulder harness, front air bag or the vehicle, the seat occupant rebounds backward toward air bag 22. Air bag 22 contacts the lumbar spine and shoulder blade regions of the seat occupant and cushions the impact between the lumbar spine and shoulder blade regions of the seat occupant and vehicle seat 14 as air bag 22 deflates.

It can be seen from the preceding description that an air bag safety device for vehicles has been provided that deploys an air bag, following a front end type collision, from the vehicle seat into the region located between the vehicle seat and the lumbar and shoulder blade region of the vehicle seat occupant; and that includes a weight sensor positioned within the vehicle seat that detects the presence of a seat occupant and enables activation of an air bag deployment system.

It is noted that the embodiment of the air bag safety device for vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An air bag safety device for a vehicle comprising:
   a collision sensing system including:
      at least two collision sensing sensors each having a deployment control output,
      a safety sensor having a safety control output, and
      a weight sensor having a weight control output; and
   an air bag deployment system, positioned within a vehicle seat, having at least one deployment control input in electrical connection with said deployment control outputs of said at least two collision sensing sensors, a safety control input in electrical connection with said safety control output of said safety sensor, a weight sensor input in electrical connection with weight control output of said weight sensor, and a gas deployable contoured air bag having a shape corresponding to a lumbar spine and shoulder blade region of a human;
   said air bag deployment system being oriented with respect to said vehicle seat in a manner such that, when said contoured air bag deploys, said contoured air bag deploys into a region between said vehicle seat and a lumbar and shoulder blade region of an occupant of said vehicle seat, said air bag deployment system deploying said contoured air bag upon detection by said air bag deployment system of a first safety control output signal from said safety sensor safety control output, a second weight control output signal from said weight sensor weight control output, and at least one third deployment control signal from one of said collision sensor deployment control outputs.

2. The air bag safety device for vehicles of claim 1, wherein:
   said contoured air bag has about a five inch thick central portion that tapers to about a two inch thickness at upper and lower ends.

3. The air bag safety device for vehicles of claim 1, wherein:
   said air bag deployment system further includes an auxiliary power input, and said air bag safety device further includes a battery back up in electrical connection with said auxiliary power input.

4. The air bag safety device for vehicles of claim 3, wherein:
   said contoured air bag has about a five inch thick central portion that tapers to about a two inch thickness at upper and lower ends.

* * * * *